United States Patent
Colli et al.

[11] Patent Number: 5,249,752
[45] Date of Patent: Oct. 5, 1993

[54] COMBS FOR APPLICATION TO SUCTION NOZZLES FOR SEIZING THE END OF YARNS WOUND IN PACKAGES

[75] Inventors: Luigi Colli; Luciano Bertoli, both of Pordenone; Omar Pajer, Roveredo In Piano, all of Italy

[73] Assignee: Savio S.p.A., Pordenone, Italy

[21] Appl. No.: 938,493

[22] Filed: Aug. 31, 1992

Related U.S. Application Data

[63] Continuation of Ser. No. 873,659, Apr. 23, 1992, abandoned, which is a continuation of Ser. No. 523,487, May 15, 1990, abandoned.

[30] Foreign Application Priority Data

May 16, 1989 [IT] Italy ................................ 20524 A/89

[51] Int. Cl.$^5$ ............................................. B65H 69/04
[52] U.S. Cl. .............................................. 242/35.06 E
[58] Field of Search .................. 242/35.6 R, 35.6 E; 57/261, 353

[56] References Cited

U.S. PATENT DOCUMENTS

| | | | |
|---|---|---|---|
| 2,857,113 | 11/1954 | Kupper | 242/35.6 R |
| 3,361,372 | 1/1968 | Pesch | 242/18 R |
| 3,652,025 | 3/1972 | DiMauro | 242/35.6 E |
| 3,803,014 | 4/1974 | Atkinson | 204/206 |
| 4,550,886 | 11/1985 | Fujiwara et al. | 242/35.6 E |

FOREIGN PATENT DOCUMENTS

| | | |
|---|---|---|
| 1804472 | 5/1970 | Fed. Rep. of Germany . |
| 0313272 | 12/1989 | Japan ............................ 242/35.6 E |
| 2189179 | 10/1987 | United Kingdom . |

OTHER PUBLICATIONS

Laser Undoptoelektronik, No. 20, Apr. 1988, Stultgart DE, pp. 48–51 by J. M. Weick & W. Storz; "Neue Aspekte zum Trennen von Metallenmit $CO_2$—Lasern" W. Germany.

*Primary Examiner*—Daniel P. Stodola
*Assistant Examiner*—Michael R. Mansen
*Attorney, Agent, or Firm*—Robert D. Schaffer

[57] ABSTRACT

An angular comb for application to suction nozzles for seizing the end of yarns wound in the form of packages, which is formed from a flat plate by precision cutting followed by bending, and comprises toothing having a height/pitch ratio of between 2.5 and 3.5 and having narrow V-shaped lead-ins between the teeth.

6 Claims, 4 Drawing Sheets

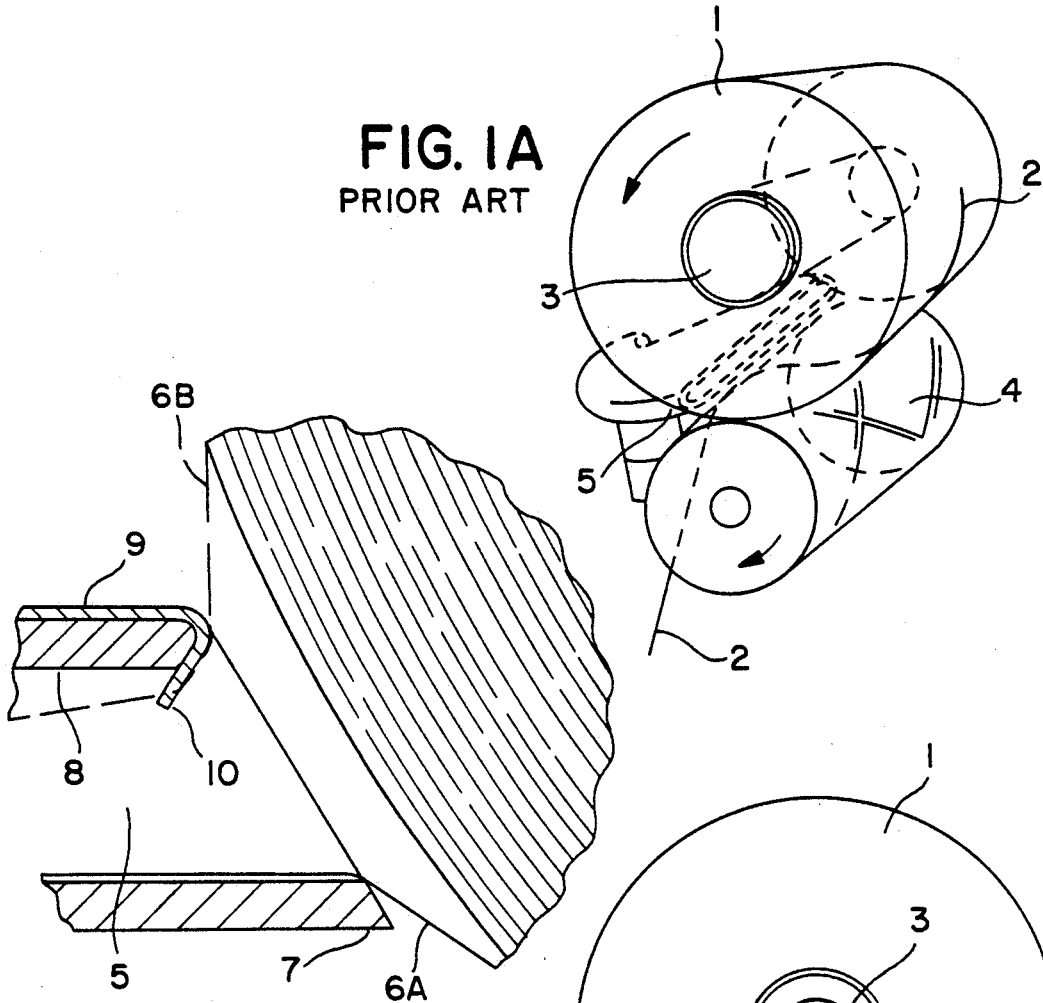
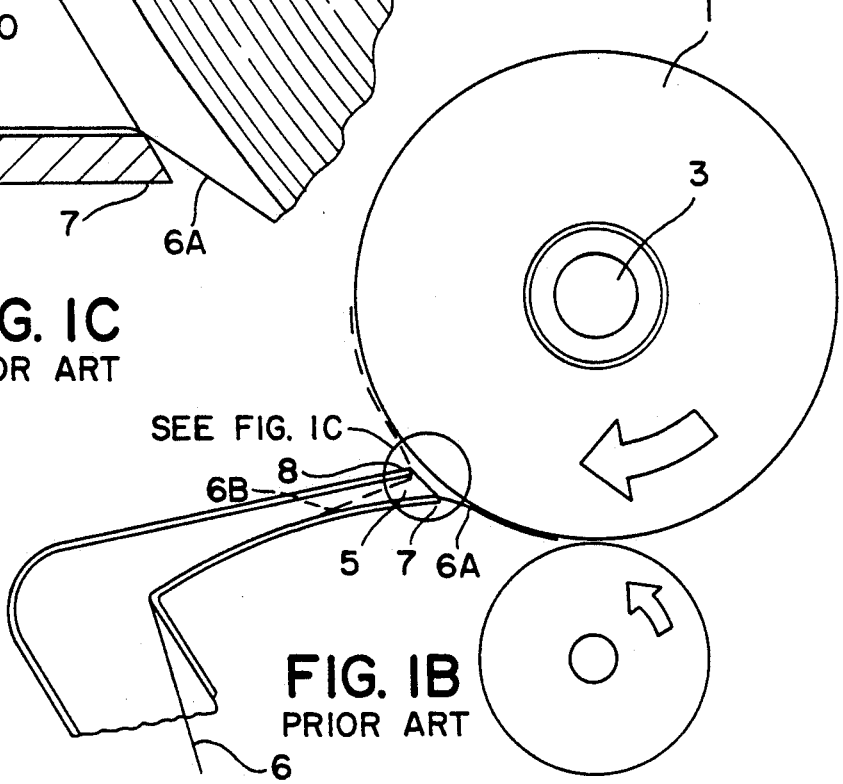

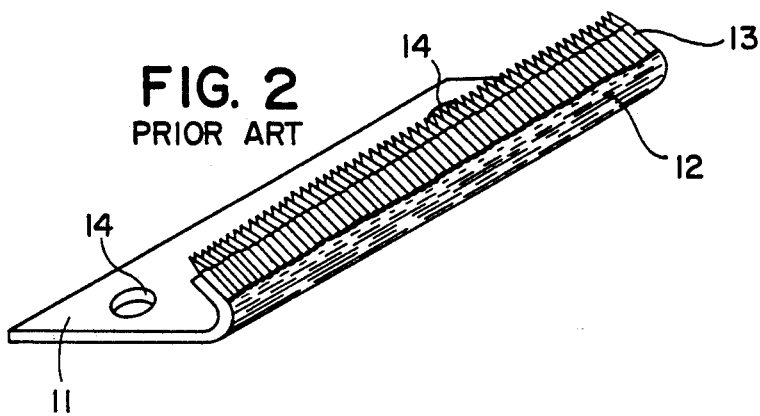
FIG. 2 PRIOR ART
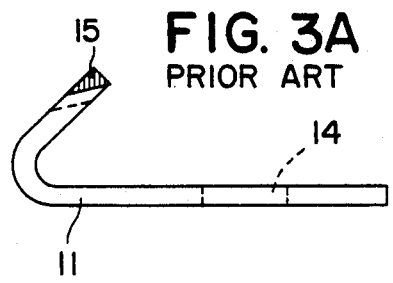
FIG. 3A PRIOR ART
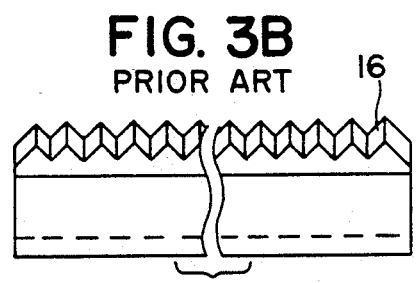
FIG. 3B PRIOR ART
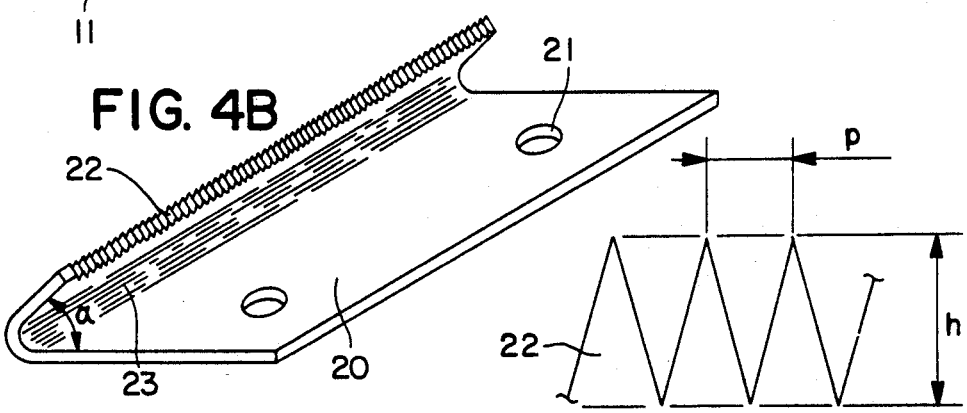
FIG. 4B
FIG. 4C
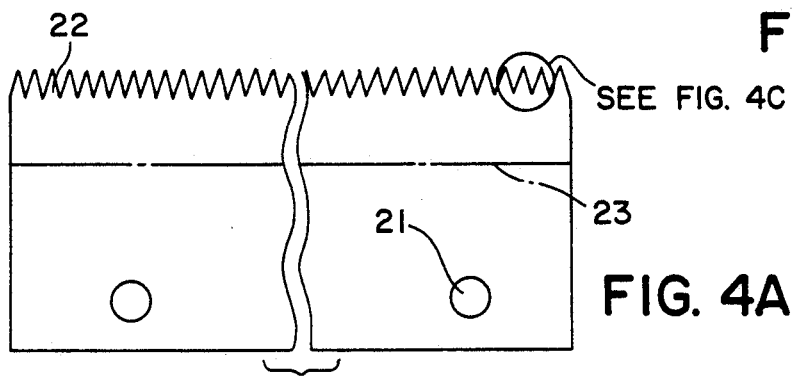
FIG. 4A

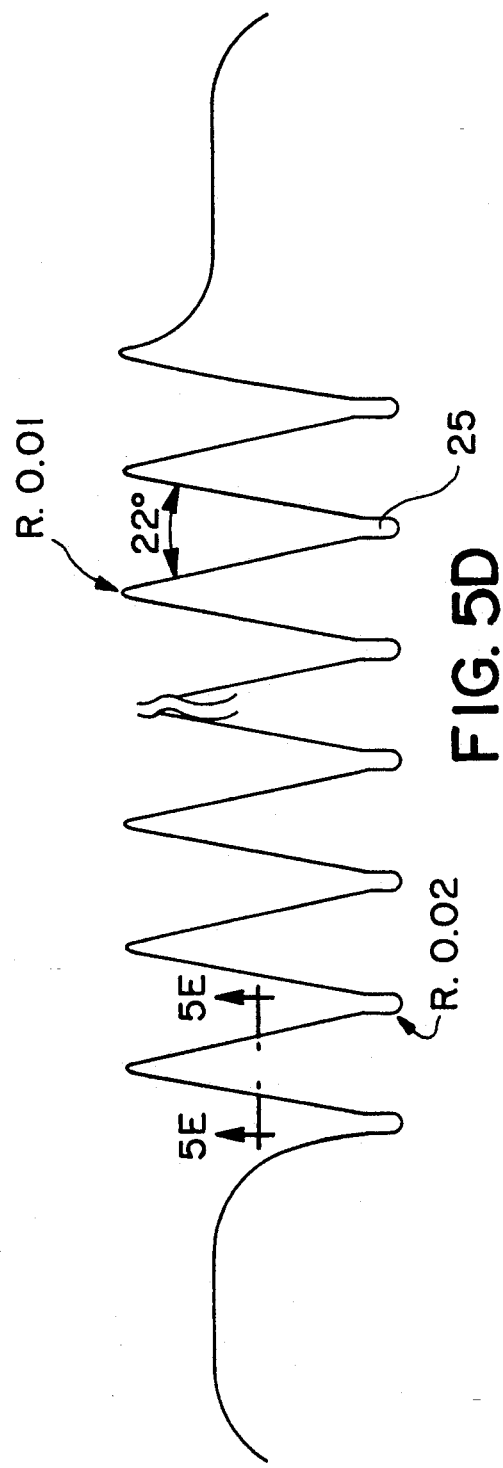

COMBS FOR APPLICATION TO SUCTION NOZZLES FOR SEIZING THE END OF YARNS WOUND IN PACKAGES

This is a continuation of application Ser. No. 07/873,659, filed Apr. 23, 1992, which is, in turn, a continuation of Ser. No. 07/523,487, filed May 15, 1990, both now abandoned.

BACKGROUND OF THE INVENTION

This invention relates to a suction nozzle of high seizure efficiency for seizing the end of yarns wound in packages such as yarn bobbins obtained from spinning or winding processes. More particularly the invention relates to an improved comb which when applied to said suction nozzle provides it with this high seizure efficiency, and a method for its production.

The present invention finds application in the textile industry and in the processing and production of textile fibres, and is described hereinafter by way of non-limiting example with reference to the winding process, however it can be advantageously applied to all processes in the textile industry in which it is necessary to seek and seize a yarn end from a cylindrical or conical yarn package.

The technical problem confronted and solved by the present invention is described hereinafter with reference to FIGS. 1A and 1B.

The yarn package 1 is wound with yarn 2 by rotating the package about the axis 3 in the direction of the heavy black arrow by means of the rotary drive roller 4 against which it rests and by which it is driven by friction at constant linear speed.

When a breakage in the yarn 2 occurs, a sensor not shown in the figure senses this interruption and causes stoppage of the winding procedure, which can be restarted when the ends of the interrupted yarn have been joined together. It is therefore necessary to seek and seize the yarn ends from the feed side and from the forming package side 1. The seizing of the yarn end on the package side 1 is generally effected by a suction nozzle 5 of elongated shape which is moved up to a generator of the package 1.

The package 1 is rotated in the opposite direction to that of normal winding, i.e. in the direction of the white arrow (FIG. 1B), by a supplementary drive not shown on the figure, and the yarn end 6 is sucked by the nozzle 5 along a length which is sufficient to reliably retain the yarn, this length being greater than that necessary for the subsequent operations for restoring continuity to the yarn 2. The nozzle is then moved so that it conveys the seized yarn end 6 to the yarn joiner which restores the continuity of the yarn 2 and allows winding to restart.

If the yarn end 6 does not encounter obstacles, as it is unwound by the effect of the contrary rotation of the package it flows into the suction nozzle 5 along the more forward lip 7 of the nozzle, and no problems are encountered, as shown in 6A in FIG. 1B and FIG. 1C.

A technical problem, to be solved by the invention, may however arise in that the yarn end 6 may not unwind easily from the package 1 either because it adheres to the hairiness of the yarn turns adjacent to it or because the winding is imperfect. In this case the yarn end 6 finds itself in the situation indicated by the dashed line 6B. The yarn end moves to the opposite lip 8 of the nozzle and the counter-rotation of the package tends to withdraw the yarn end 6 from the mouth 5, so that the yarn end cannot be correctly recovered and seized.

To obviate this drawback, which seriously hinders the restoration of yarn continuity because the mouth is unable to convey the yarn end to the joining members, it is known in the art to apply inserts to that lip 8 which is more set back from the normal level of the arriving yarn end to be seized, these inserts increasing the retention action on the yarn and being in the form of irregular-surface inserts, toothing, angular blades or toothed blades, as described in U.S. Pat. Nos. 2,857,113, 3,361,372, 4,550,886 or as has been provided in the AUTOCONER winder of W. Schlafhorst & Co. since 1970.

These inserts are generally applied in the form of an angular blade 9 fixed to the outer edge of the lip 8 such that its comb toothing 10 extends towards the interior of the aperture of the nozzle 5, they then exerting a retention action on the sucked yarn end which overcomes the resistance of the yarn end to its proper unwinding. These angular blade inserts 9 are constructed in the known art by very complicated and costly methods starting from an angular-bent blade.

In one known embodiment shown in FIG. 2, a plurality of small substantially cylindrical pins 13 are applied by brazing 12 to a blade 11 already shaped to an acute angle, so that they lie a predetermined uniform distance apart along the outer edge of the side bent at an acute angle. Holes 14 are provided in the opposite side to fix the thus toothed blade 11 to the lip 8.

In a further known embodiment shown in FIGS. 3 3A, and 3B that side of the blade 11 bent at an angle is firstly machined to remove its end part 15 shown by hatching (FIG. 3A) after which its thin edge is machined with a profiled front grinding wheel to create the toothing 16 (FIG. 3B) of skew pyramid shape.

These techniques are very complicated and costly because each blade has to be individually formed, and the resultant combs can cause problems because if the teeth are very tall they tend to tear the yarn and become clogged with individual fibres, whereas if they are very short they insufficiently grip the yarn end.

SUMMARY OF THE INVENTION

The present invention provides a retention comb free of the aforesaid drawbacks for application to a yarn seizing suction nozzle by a method which is flexible, simple and economical.

BRIEF DESCRIPTION OF THE DRAWINGS

The present invention is described with reference to FIGS. 4A, 4B, 4C, 5A, 5B, 5C, 5D and 5E which show a typical embodiment thereof by way of non-limiting example.

FIG. 1A is an orthogonal view of a yarn package rotated by a drive roller as known in the prior art.

FIG. 1B is a side view of the embodiment of FIG. 1A.

FIG. 1C is an enlarged view of the embodiment shown in FIG. 1B illustrating the yarn ends sucked into the suction nozzle.

FIG. 2 is an orthogonal view of a tooth blade as known in the prior art.

FIG. 3A is another embodiment of a blade as known in the prior art.

FIG. 3B is an illustration of the teething of a blade as known in the prior art.

FIG. 4A is a front view of the tooth blade of the present invention.

FIG. 4B is an orthogonal view of the tooth blade of the present invention.

FIG. 4C is an enlarged view of the teeth shown in the blade illustrated in FIG. 4A.

FIG. 5D is the final configuration of the comb of the present invention.

FIG. 5E is a cross-sectional view taken from section lines VE in FIG. 5D.

DESCRIPTION OF THE PREFERRED EMBODIMENTS

Figure 5A:
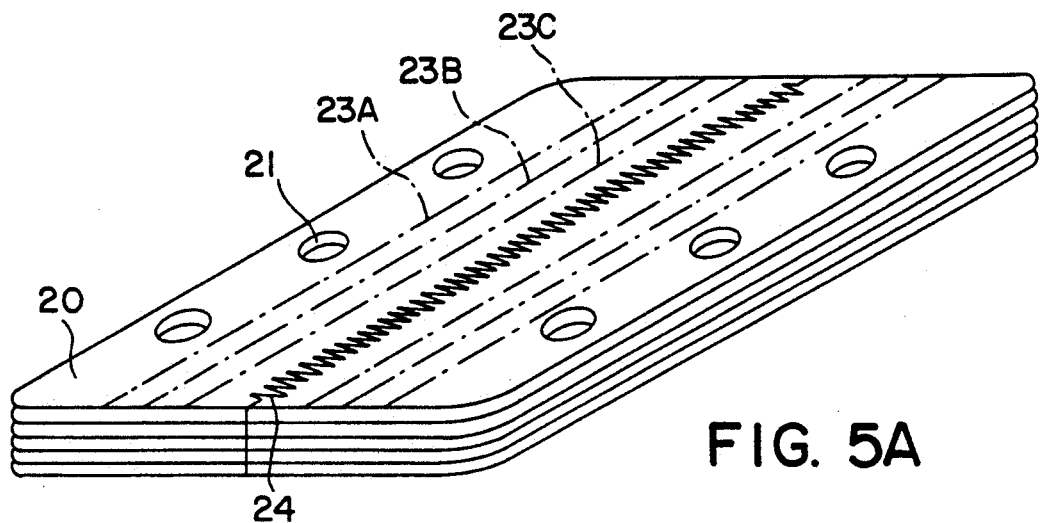
FIG. 5A is an orthogonal view of a pack of flat plates for cutting the blade of the present invention.

The comb of the present invention is formed starting from a flat plate 20 already preferably provided with holes 21 for fixing it wherein its teeth are formed preferred embodiment of the invention, the plates 20 are stacked into packs (FIG. 5A) comprising a plurality of plates, and then undergo thermal precision cutting, such as wire electroerosion or laser cutting.

This cutting operation is effected to provide a teeth profile 22 having the following characteristics:

| | |
|---|---|
| pitch p | from 0.3 to 0.5 mm |
| height h | from 0.8 to 1.5 mm |
| tooth opening angle | from 20° to 35° |
| thickness t | from 0.2 to 0.7 mm (preferably 0.3–0.5 mm) |
| ratio h/t | from 2.5 to 3.5 |

The blades resulting from the cutting operation which has formed toothing in the rough state are then bent along one or more lines 23A parallel to the toothed edge 22, with an angle $\alpha$ between the toothed edge and the fixing edge preferably of between 50° and 70°.

If the blades were left with the toothing in its rough state, their grip would be too strong because of the presence of machining burrs and roughness, and could also in the long run become clogged with fibres.

After cutting and bending, the rough blades are therefore subjected to electrochemical treatment known as electrochemical deburring, by treating with acids in solution while passing a direct current through, this treatment removing the machining burrs and rounding sharp edges, cavities and points, so eliminating all possible sources for trapping the individual fibres or cutting the yarn, while at the same time providing reliable retention of the yarn penetrating into the V toothing which is progressive in its effectiveness and is able to retain yarns of very different count.

The process is completed by means of protective electroplating, such as nickel plating, this making the blade surface even more smooth and free of roughness or cutting edges.

A description of the comb and method according to the invention are given hereinafter by way of example with reference to FIGS. 5A–5E, from which the characteristics and advantages will be more apparent.

EXAMPLE

Figure 5B:
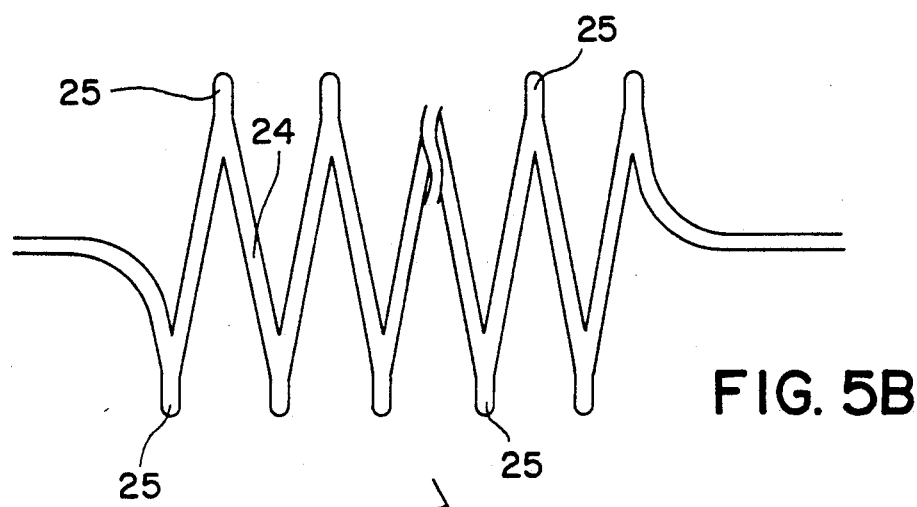
FIG. 5B is the laser beam path for cutting the teeth of the blade of the present invention.

A pack of n flat plates 20 of mechanical construction steel such as C 100 provided on both its opposing long sides with fixing holes 21 is cut with a laser beam along its centre following the path 24 of FIG. 5B so that the two parts separated by the cut are symmetrical, with a parallel-faced cut 25 being provided at the points of the comb teeth. In this manner 2n combs are formed by a single cut.

Figure 5C:
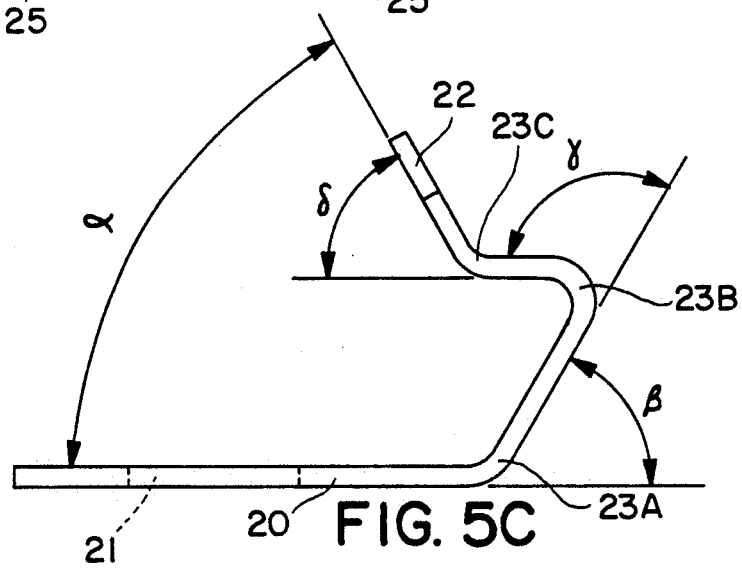
FIG. 5C is a side view showing the folds of the blade of the present invention.

After the laser cutting operation the rough blades 20 are bent at an angle as indicated in FIG. 5C, by means of three folds to give a total angle of about 60° between the toothed side and the fixing side. By way of example, the angles are $\alpha \approx 60°$, $\beta \approx 65°$, $\gamma \approx 115°$ and $\delta \approx 60°$.

This multiple folding results in very significant advantages, among which at least the following deserve mention.

A comb obtained from a blade bent in this manner is very rigid even if formed from thin sheet. Using thin sheet enables a proportionally higher number of combs to be constructed, with approximately square middle toothing sections, this being the best compromise between the need to seize the yarn end and the need to allow release of the trapped fibres.

Bending along three folding lines 23A, B, C shown in FIG. 5C also enables the toothing 22 to be set at the required safety distance from the surface of the package 1 so as not to allow the toothing 22 to also retain possible slack turns wound on the package 1 which because of centrifugal effect may have projected from its surface. If such turns were to become trapped in 22 in a sufficient number they would cause blocking of the package and nozzle, with consequent stoppage of the operation. If even a single turn of slack yarn were to be seized and torn by the toothing 22 the package being wound would be of inferior quality. After electrochemical deburring and thin nickel plating, the final configuration of the comb is as shown in FIGS. 5D–5E, with smooth rounded surfaces which do not retain individual fibres and do not become clogged. The final grooves 25 are able to reliably seize and retain yarns of even the finest count, whereas the yarns of greater transverse dimension engage in the intermediate parts of the acute V spaces between the teeth.

As already stated, the present invention can be implemented using either the wire electroerosion cutting process, which enables packs of metal plates of the order of centimetres thick to be cut reliably along a given path, or the more widespread laser cutting process, which can cut metal thicknesses of the order of a few millimetres reliably along a given line. Beyond a certain cutting thickness the laser beam tends generally to diverge and produce a wider cut.

Although the comb according to the invention can be formed by precision-punching the plate, thermal cutting by wire electroerosion or by laser are preferable because they enable the cutting path 24 to be varied according to working requirements and to be adapted to the user's requirements without having to modify the cutting machine.

We claim:

1. An angular comb for application to suction nozzles for seizing the ends of yarns wound in the form of conical or cylindrical packages having a yarn catcher made from a separate plate fixed to an edge or lip of the suction nozzle thereby defining a fixed side, wherein one long side of said plate is toothed thereby defining a toothed side, the lead-in between the teeth is in the form of a narrow V and the inner recess of the V-shaped lead-in is in the form of a notch having flat non-convergent faces and a curvilinear interconnecting surface to thereby provide a substantially "U" shaped inner recess which will remain free from debris and provide for efficient capture without tearing the yarn.

2. An angular comb as defined in claim 1 wherein the toothing pitch is between 0.3 and 0.5 mm and the toothing height is between 0.8 and 1.5 mm.

3. An angular comb as defined in claim 1, wherein the toothing is of a uniform thickness which is substantially equal to the thickness of the plate and is between 0.2 and 0.7 mm.

4. An angular comb as defined in claim 3, wherein said toothing thickness is between 0.3 to 0.5 mm.

5. An angular comb as defined in claim 1, wherein said plate has three folds between the toothed side and the fixed side.

6. An angular comb as defined in claim 5 wherein said plate has a first fold at an angle of about 65°, a second fold at an angle of about 115° and a third fold at an angle of about 60° to give a total angle between toothed side and fixed side of about 60°.

* * * * *